UNITED STATES PATENT OFFICE.

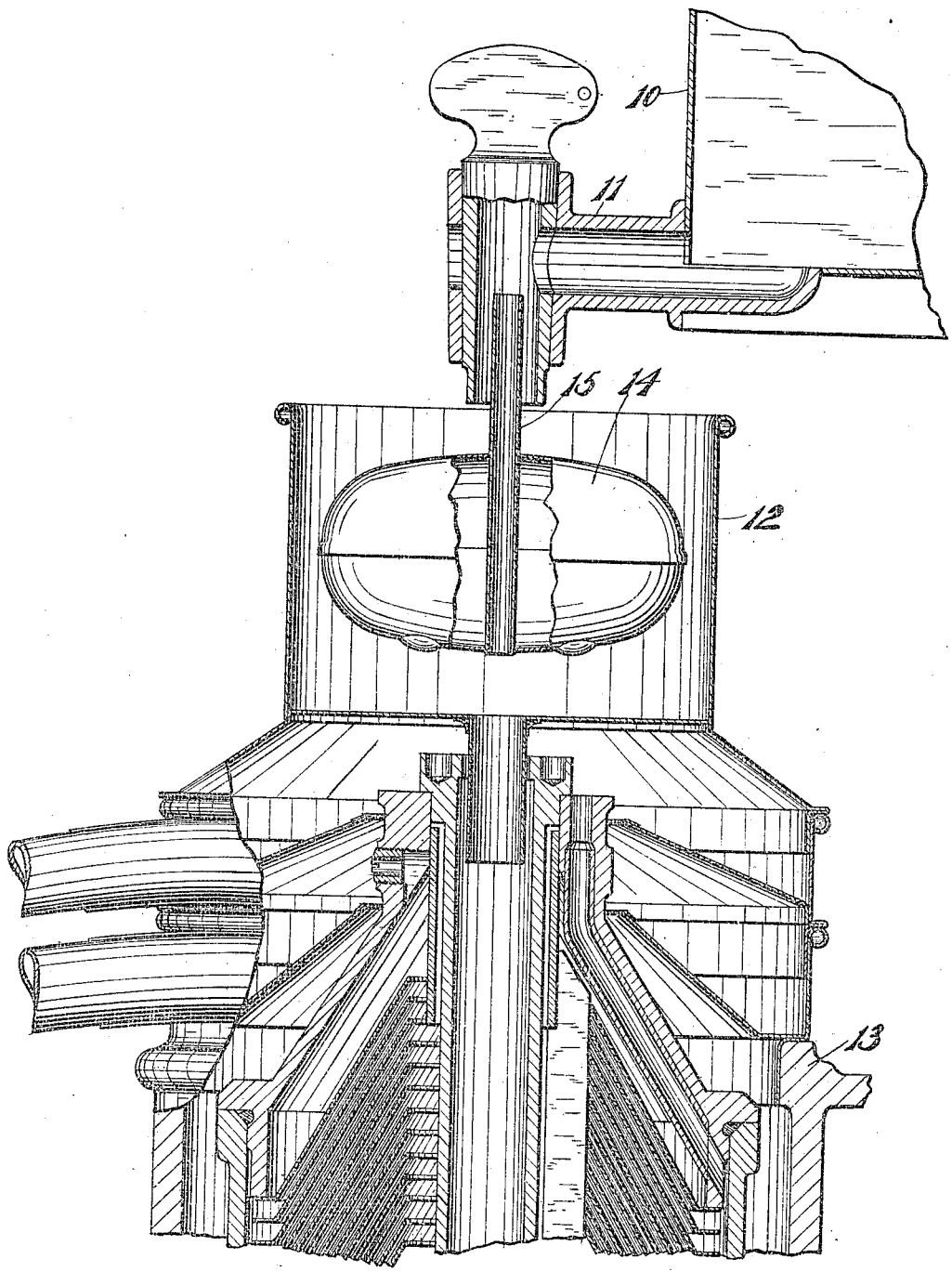

CHARLES H. SHAW, OF MILWAUKEE, WISCONSIN, ASSIGNOR TO STANDARD SEPARATOR COMPANY, A CORPORATION OF NEW JERSEY.

FLOAT FOR CENTRIFUGAL SEPARATORS.

959,625.     Specification of Letters Patent.     Patented May 31, 1910.

Application filed January 21, 1909. Serial No. 473,421.

*To all whom it may concern:*

Be it known that I, CHARLES H. SHAW, residing in Milwaukee, in the county of Milwaukee and State of Wisconsin, have invented new and useful Improvements in Floats for Centrifugal Separators, of which the following is a description, reference being had to the accompanying drawings, which are a part of this specification.

This invention has for its object to provide a float for use with centrifugal separators which will avoid the splashing of milk over the edges of the funnel when the float rises to check the supply of milk to the separator.

Heretofore floats for centrifugal separators have been provided with a solid stem entering the nozzle of the supply cock and relying on the upper surface of the float or a conical boss thereon to choke the outlet from the cock and thus diminish the flow of milk therefrom when the level of the milk in the funnel is high and indicates an over supply. An objection incident to such constructions has been that the milk flowing from the cock under pressure of the supply in the tank is liable to be sprayed over the top of the funnel. Much milk is frequently lost in this way and the feature is disagreeable as the milk may be thrown in any direction upon anything in the neighborhood of the separator.

By means of the present invention the above disagreeable effect is overcome by providing a tube through the center of the float to form its stem, which tube will constitute a passageway for the milk at the times of checking the flow and thus relieve the pressure at the meeting edges between the float and the nozzle of the cock.

With the above objects in view the invention consists in the float for centrifugal separators herein claimed, and all equivalents thereof.

In the accompanying drawings the figure illustrates a portion of a centrifugal separator provided with a float constructed in accordance with this invention.

In these drawings 10 indicates the milk supply tank and 11 is the cock leading therefrom and discharging the milk into the funnel 12 of a separator bowl chamber 13. The float 14 which is of the usual hollow sheet metal form is provided with a metal tube 15 passing therethrough from top to bottom and with its upper end extended above the float to form its stem. This stem of the float rides within the nozzle of the cock 11 to form a guide to cause the float to properly seat against the mouth of the nozzle when the level of the milk in the funnel 12 is sufficiently high and thus check the flow of milk from the tank. At such times a portion of the normal flow is maintained through the tube 15 which allows the seating of the float against the nozzle of the cock without spraying the milk over the edges of the funnel. When the separator bowl has consumed sufficient milk to relieve the funnel of its surplus and the supply through the tube 15 is insufficient to meet the requirements of the separator bowl the float will lower with the changed level of the milk in the funnel and allow the normal flow of milk over the float in addition to the flow through the tube 15.

By means of this invention disagreeable spraying of milk by the seating of the float on the nozzle of the cock is entirely avoided.

What I claim as new and desire to secure by Letters Patent is:

1. In a centrifugal separator, a supply tank having a discharge faucet with a depending nozzle, a receiving chamber into which the faucet discharges, and a float contained in the receiving chamber beneath the faucet and adapted to seat its upper surface on the lower end of the nozzle of the faucet for restricting the flow therefrom, there being a passageway through the float to allow a flow of milk therethrough when the float is seated on the nozzle of the faucet.

2. In a centrifugal separator, a supply tank having a discharge faucet with a depending nozzle, a receiving chamber into which the faucet discharges, a float contained in the receiving chamber beneath the faucet and adapted to seat its upper surface on the lower end of the nozzle of the faucet for restricting the flow therefrom, and a tube extending through the float to form a passageway for milk when the float is seated on the nozzle of the faucet.

3. In a centrifugal separator, a supply tank having a discharge faucet with a depending nozzle, a receiving chamber into which the faucet discharges, a float contained in the receiving chamber beneath the faucet and adapted to seat its upper surface on the lower end of the nozzle of the faucet for restricting the flow therefrom, and a tube extending through the float and above the same to form a stem entering the nozzle of the faucet to guide the float in its movements, said tube forming a passageway for maintaining a reduced flow of milk when the float is seated on the nozzle of the faucet and thereby prevent the spraying of the milk between the nozzle of the faucet and the float.

In testimony whereof, I affix my signature, in presence of two witnesses.

CHARLES H. SHAW.

Witnesses:
R. S. C. CALDWELL,
ANNA F. SCHMIDTBAUER.